May 16, 1933.  H. SCHIMMEL  1,909,225
APPARATUS FOR MACHINING ROLLS FOR ROLLING MILLS
Filed Dec. 21, 1931  3 Sheets-Sheet 1
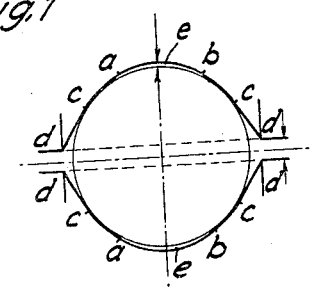
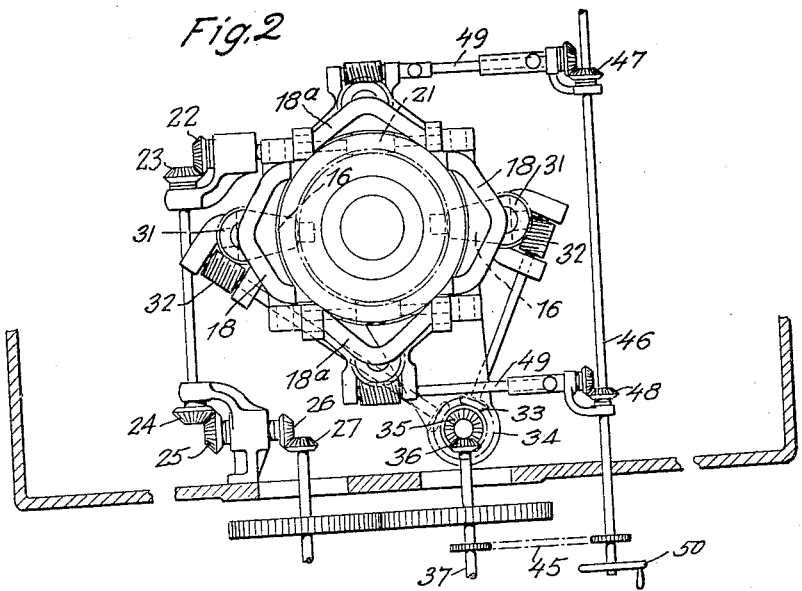
INVENTOR
HANS SCHIMMEL

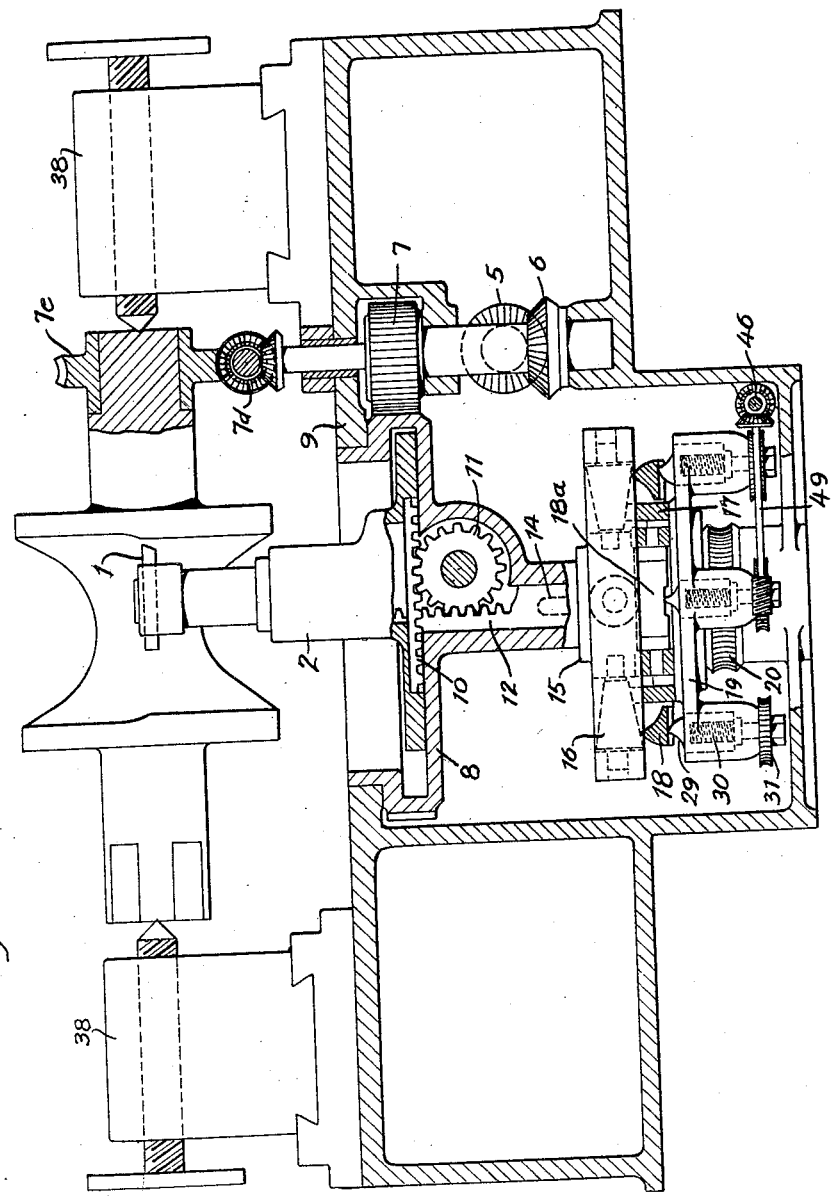

Patented May 16, 1933

1,909,225

UNITED STATES PATENT OFFICE

HANS SCHIMMEL, OF KOMOTAU, CZECHOSLOVAKIA

APPARATUS FOR MACHINING ROLLS FOR ROLLING MILLS

Application filed December 21, 1931, Serial No. 582,466, and in Germany February 23, 1931.

This invention relates to an improvement in or modification of the apparatus for machining rolls for rolling mills and the like.

In my copending application Serial No. 514,620 filed on February 9th, 1931, in the name of Hans Schimmel, entitled "Method and apparatus for machining rolls for rolling mills and the like" there is illustrated and described apparatus for machining circumferential grooves in Pilger and like rolls in which a tool holder is arranged to extend between a pair of rolls mounted on the machine and is subjected to periodical radial displacements as the tool holder rotates, whilst the tool therein effects cuts across the peripheral faces of the rolls. The radial displacements of the tool holder are arranged to effect, in conjunction with the rotational movement thereof, the cutting of inclined side portions of the grooves in the rolls.

The radial movements of the tool holder from a purely circular movement, during which the bottom of the groove is cut, through a path corresponding to the ensuing outward cut along the inclined side of the groove is positively controlled by a cam operatively associated with the tool holder. A pair of such cams are arranged diametrically opposite to one another relatively to the axis of the tool holder, so as to control the radial displacements of the tool holder when the inclined side portions of the grooves in a pair of aligned rolls are being machined, and between which the tool holder extends. With this construction, it is only possible to machine the bottom portions of the grooves with a purely circular contour.

According to this invention, the tool holder is subjected during the working operations to periodical supplementary displacements in a radial direction with respect to its axis of rotation. By this method of working it is possible to produce rolls in which the grooves therein are modified in various ways from the form of groove which it is possible to produce in accordance with my older specification. For example, rolls may be produced with one or more annular depressions formed in the otherwise purely circular central portion of the roll. The periodical displacements during each revolution of the tool holder are dependent upon the number of recesses or other configuration which it is desired to produce in the groove of the roll.

In order that the invention may be fully understood, reference is directed to the accompanying drawings, in which:—

Figure 1 is a diagram illustrating in section the grooves formed in a pair of Pilger rolls machined by a method in accordance with this invention, Figure 2 is a sectional plan of a portion of the apparatus constructed in accordance with my older application and modified in accordance with this invention.

Figure 4 is an elevation of the means for supporting the rolls, also showing the tool holder, and partly in vertical longitudinal section through the control mechanism therefor.

Figure 3:
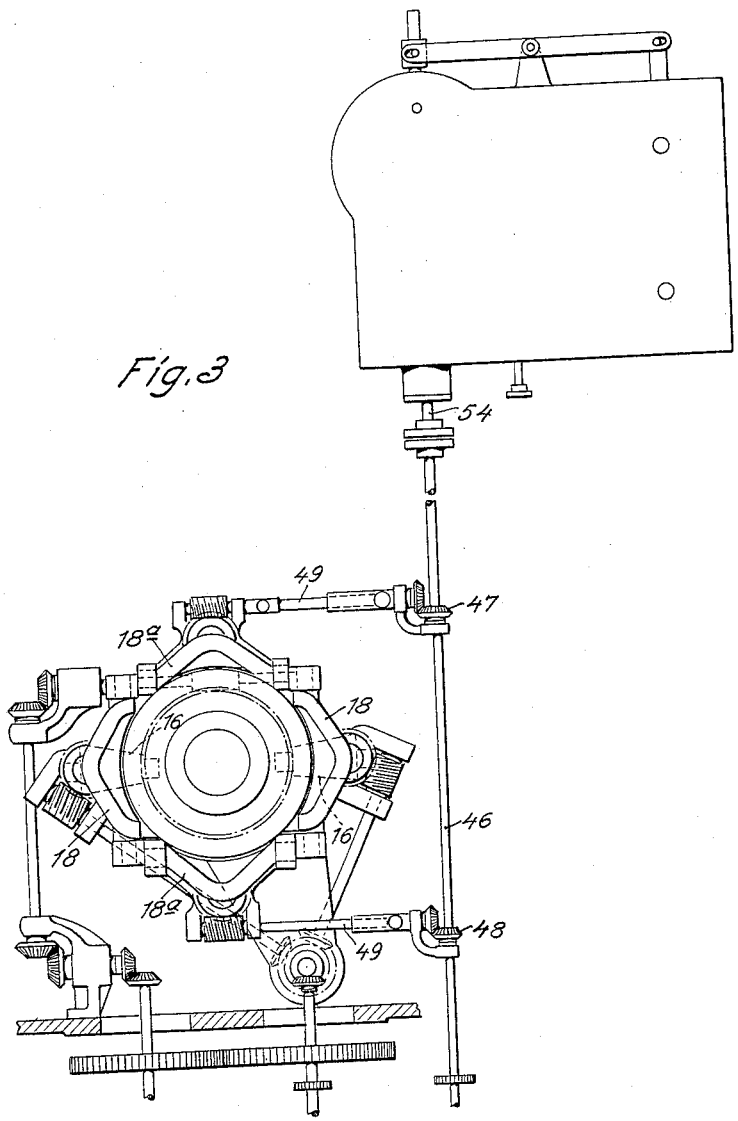
Figure 3 is a modification of the apparatus illustrated in Figure 2.

Referring to Figure 4, a tool 1 is secured in a tool holder 2 which is arranged to be rotated by means of bevel gears 5 and 6 and a gear wheel 7 arranged in mesh with a ring of teeth provided upon the exterior of the upper portion of a rotatable arbour 8 arranged to carry the tool holder 2. The said tool holder is mounted in the enlarged upper portion of the arbour 8 so as to be movable relatively thereto in a radial direction of the said arbour.

The upper portion of the arbour 8 is rotatably mounted in a fixed housing 9. The radial movement of the tool holder 2 is effected during the rotary movements of the arbour 8 by mechanism illustrated in Figure 4, which is located interiorly of the said arbour. The said mechanism consists of a horizontally disposed toothed rack 10 secured to the tool holder 2, a toothed wheel 11 arranged in mesh therewith and with a further toothed rack 12 constituting a driving rod for the said mechanism.

The actuation of the rack 12 is effected by means of rising and falling movements of a pin (not shown) secured to the said rack and the ends of which extend through diametrically opposed slots 14 formed in the arbour 8, the said ends being secured to a cage 15 arranged to surround the said arbour. The cage 15 is slidably arranged on the arbour 8 and is arranged to be moved vertically under the control of means hereinafter described, arranged to act upon two rollers 16 mounted in the said cage.

The pin in the slot 14 in addition to transmitting the rising and falling movements of the cage 15 to the rack 12, is arranged to transmit rotary motion from the arbour 8 to the cage 15, but if desired, a coupling, other than the pin in the slots 14 may be arranged between the arbour 8, and the cage 15, so that the correct rising and falling movements of the cage relative to the arbour are not disturbed by a binding action of the pin in the slots 14.

The holder 19 is provided with an internal screw thread arranged in engagement with a corresponding screw thread formed externally upon an upward extension of a worm wheel 20 rotatably mounted upon a bearing provided on the casing of the mechanism and arranged in mesh with a worm 21. Rising and falling movements of the holder 19 are effected by rotation of the worm wheel 20 by means of the worm 21. The worm 21 is carried by a spindle rotatably mounted in bearings on the frame of the mechanism to which rotary motion is imparted through the medium of a train of bevel wheels 22, 23, 24, 25, 26, 27, the bevel wheel 27 being mounted upon one end of a rotatable spindle 28.

The sleeves 29 are each provided with an internally screw threaded hole with which a correspondingly screw threaded spindle 30 is arranged in engagement.

Each spindle 30 is rotatably mounted in a bearing formed in the holder 19 and is arranged to extend below the said holder and is provided with a worm wheel 31 keyed thereto. A worm 32 is arranged in mesh with each of the worm wheels 31 and is arranged to be rotated through the medium of a train of bevel wheels 33, 34, 35, 36, the bevel wheel 36 being secured to one end of a rotatable spindle 37.

The roll or rolls to be machined are supported on headstocks 38, movable perpendicularly to their axis corresponding to the different diameters of the rolls to be worked. For each roll a worm $7d$ meshes with a worm wheel $7e$ placed on the roll pin, and gives the roll a feeding movement.

Referring to Figure 1, the portions $c$, $a$ and $b$, $c$ of the grooves in the rolls are of a purely circular contour and are machined by an unmodified rotational movement of the tool holder located between the rolls. The inclined side portions $c$, $d$ of the rolls are machined by radial displacements of the tool holder as the same rotates in accordance with the method described in my older specification. These displacements of the tool holder are effected through the medium of segmental cams 18, Figure 2, coacting with rollers, indicated diagrammatically at 16, which are operatively connected to the tool holder (not shown) as described in my older specification.

In order to produce the deepened annular portions $e$ extending from $a$ to $b$, Figure 1, in the base of the grooves in the rolls, a pair of diametrically oppositely disposed supplementary cams 18$a$, Figure 2, are provided in the apparatus and are arranged to effect radial displacements of the tool holder in a similar manner to the displacements effected by the cams 18.

Means are described in my older specification by which the effective height of the cams 18 may be varied, the cams being pivotally mounted upon a carrier and arranged to be raised and lowered through the medium of mechanism driven from a spindle 37, Figure 2.

In order that the cams 18$a$ may be adjusted in a similar manner to the cams 18, the spindle 37 is coupled by means of a chain drive 45 to a spindle 46 which is coupled by means of bevel wheels 47, 48 to a pair of spindles 49, each of which is operatively connected to mechanism adapted to vary the effective height of one of the cams 18$a$.

It will be appreciated that as the rollers 16 roll over the cams 18$a$, supplementary radial displacements of the tool holder will be produced to effect the cutting of the deepened portions $e$ of the grooves in the rolls.

It will be appreciated that by provision of additional cams similar to the cams 18 and 18$a$, further additional periodical radial displacements of the tool holder may be effected and thus any desired form of groove in a roll produced.

If desired, the variation in height of the cams 18$a$ or of any other supplementary cams, may be effected independently of the variations of the cams 18. For example, in the arrangement illustrated in Figure 2, the spindle 46 need not necessarily be driven from the spindle 37 but from any other part of the machine as may be desirable, for example by a hand wheel 50, Figure 2, or a crank lever. The chain drive 45 is removed when the spindle 46 is operated by a hand wheel or the like.

Figure 3 illustrates an arrangement in which a servo motor apparatus comprising a template is used as described in my older specification Ser. No. 579,761.

The spindle 46 of the present apparatus is connected with the spindle 54 of the servo motor apparatus and the spindle 41 of this apparatus is connected with the driving spindle of the Pilger rolls travel mechanism.

I claim:

1. A method of machining the circumferential portions of rolls, for example, rolls for Pilger rolling mills, which consists in subjecting a roll to cuts axially thereof from an edge cutting tool as the tool rotates and moves radially with respect to the axis of rotation thereof during at least three angles of movement in each rotation thereof in conformity with the contour of the desired cross section of the roll and in a plane substantially parallel to or coincident with a plane extending through the axis of rotation of the roll, and feeding the roll to the tool between cutting operations thereof by rotating the roll.

2. A method of machining the circumferential portions of rolls, for example rolls for Pilger rolling mills which consists in subjecting a pair of rolls arranged in side by side relationship with one another and with their axes parallel, to cuts axially thereof from an edge cutting tool as the tool rotates between the rolls and moves radially with respect to the axis of rotation thereof during at least four angles of movement in each rotation thereof in conformity with the contour of the desired cross section of each of said rolls and in a plane substantially parallel to or coincident with the plane extending through the axes of the said rolls.

3. In an apparatus for machining the circumferential portions of rolls of the type described, the combination of means for supporting at least one roll to be machined, a tool holder rotatable about an axis disposed transversely to the axis of a roll located in said supporting means, means operatively connected to said tool holder for moving the same radially with respect to the axis of rotation thereof during at least three different angles of movement in each rotation of said tool holder and means for rotating said roll between rotations of said tool holder.

4. In an apparatus for machining the circumferential portions of rolls of the type described, the combination of means for supporting a pair of rolls to be machined with their axes disposed parallel to one another, a tool holder located between a pair of rolls so supported, means for rotating said tool holder about an axis disposed transversely to the axis of said rolls, means operatively connected to said tool holder for moving the same radially with respect to the axis of rotation thereof during at least four different angles of movement in each rotation of said tool holder and means for rotating said rolls between rotations of said tool holder.

5. In an apparatus for machining the circumferential portions of rolls of the type described the combination of means for supporting at least one roll to be machined, an arbour rotatably mounted about an axis disposed transversely to the axis of a roll supported by said means, means for rotating said arbour, a tool holder operatively connected to said arbour so as to rotate therewith and movable radially thereon with respect to the axis of rotation of said arbour, means operatively connected to said tool holder and operable to effect said radial movements thereof during at least three different angles of movement in each rotation of said tool holder and means for rotating the said roll between rotations of said tool holder.

6. In an apparatus for machining the circumferential portions of rolls of the type described the combination of means for supporting at least one roll to be machined, a hollow arbour rotatable about an axis disposed transversely to the axis of a roll supported by said means, means for rotating said arbour, a tool holder operatively connected to said arbour so as to rotate therewith and movable radially thereon with respect to the axis of rotation of said arbour, mechanism disposed within said arbour for moving said tool holder radially of said arbour and an operative connection between said mechanism and controlling means arranged exteriorly of said arbour arranged to effect radial movements of said tool holder as the same rotates during at least three angles of movement in each rotation thereof and means for rotating the said roll between rotations of said tool holder.

7. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour and an operative connection between the ends of said pin and mechanism arranged exteriorly of said arbour adapted to effect radial movements of said tool holder as the same rotates during at least three angles of movement in each rotation thereof and means for rotating the said roll between rotations of said tool holder.

8. In an apparatus for machining the circumferential portions of rolls of the type described the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour, a cage arranged around said arbour and slidable axially thereon, means for rotating said cage with said arbour, an operative connection between said pin and said cage, at least two pairs of cams arranged to control said cage as the same rotates to move the same axially with respect to said arbour and thereby effect radial movements of said tool holder as the same rotates and the cams of each pair being diametrically disposed relatively to the axis of said arbour and said pairs of cams being angularly spaced relatively to one another about said axis.

9. In an apparatus for machining the circumferential portions of rolls of the type described the combination of means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed therein, a cage surrounding said arbour and slidable axially thereon, means for rotating said cage with said arbour, an operative connection between said pin and said cage, a ring member arranged to surround said arbour and at least two pairs of cams diametrically disposed with respect to said arbour and each pair spaced angularly with respect to the other pair about the axis of said arbour, said ring and said cams being operable to engage with said cage and to effect movement thereof in at least one direction axially of said arbour as the same rotates and thereby effect said radial movements of said tool holder as the same rotates.

10. In an apparatus for machining the circumferential portions of rolls of the type described the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, an operative connection between said second rack and a cage arranged around said arbour and slidable thereon, means for rotating said cage with said arbour, a ring member arranged to surround said arbour and at least two pairs of cams diametrically disposed with respect to said arbour and each pair spaced angularly with respect to the other pair about the axis of said arbour, said ring and said cams being operable to engage with said cage and effect movement thereof in one direction axially of said arbour and a yielding control arranged to effect movement of said cage in the other direction for the purpose specified.

11. In an apparatus for machining the circumferential portions of rolls of the type described the combination of means for supporting at least one roll to be machined, a hollow arbour rotatably mounted about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, an operative connection between said second rack and a cage surrounding said arbour and slidable thereon, means for rotating said cage with said arbour, a ring member arranged to surround said arbour and at least two pairs of cams diametrically disposed with respect to said arbour and each pair spaced angularly with respect to the other pair about the axis of said arbour, said ring and said cams being operable to engage with said cage and effect movement thereof in one direction axially of said arbour as the same rotates and a yielding control arranged to effect movement of said cage in the other direction for the purpose specified and means operatively connected to said ring and means operatively connected to said cams for moving said ring and said cams relatively to said arbour in an axial direction thereof.

12. In an apparatus for machining the circumferential portions of rolls of the type described the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially therein, a cage arranged exteriorly of said arbour and movable axially thereof, means for rotating said cage with said arbour, an operative connection between said pin and said cage, a ring member arranged to surround said arbour and at least two pairs of cams diametrically disposed with respect to said arbour and each pair spaced angularly with respect to the other pair about the axis of said arbour, said ring and said cams being operable to engage with said cage and effect movement thereof in one direction axially of said arbour as the same rotates and a yielding control arranged to effect movement of said cage in the other direction for the purpose specified, a non-rotatable support for the said ring and said cams, a screw threaded bore in said support arranged to engage with a correspondingly screw-threaded sleeve axially aligned with said arbour and maintained against axial displacement, and gear mechanism for rotating said sleeve.

13. In an apparatus for machining the circumferential portions of rolls of the type described, the combination of means for supporting at least one roll to be machined, a hollow arbour rotatable about an axis disposed transversely to the axis of a roll supported by said means, means for rotating said arbour, a tool holder operatively connected to said arbour so as to rotate therewith and slidable in guides thereon radially with respect to the axis of rotation of said arbour, a rack on said tool holder disposed transversely to the axis of said arbour and arranged in mesh with a gear wheel rotatably mounted in said arbour, a second rack disposed axially of said arbour and arranged in mesh with said gear wheel, a pin carried by said second rack and extending through diametrically opposed slots formed axially in said arbour, a cage arranged exteriorly of said arbour and movable axially thereof, means for rotating said cage with said arbour, an operative connection between said pin and said cage, a non-rotatable ring member arranged to surround said arbour and carried by a supporting member, at least two pairs of segmental cams diametrically disposed with respect to said arbour and pivotally mounted at their ends to said ring supporting member said cams being angularly spaced relatively to one another about the axis of said arbour means for rocking said cams about their pivots in the axial direction of said arbour, said ring and said cams being operable to engage with said cage and effect movement thereof in one direction axially of said arbour as the same rotates and a yielding control arranged to effect movement of said cage in the other direction for the purpose specified.

14. In an apparatus for machining the circumferential portions of rolls of the type described the combination of means for supporting at least one roll to be machined, a hollow arbour rotatable about an axis disposed transversely to the axis of a roll supported by said means, means for rotating said arbour, a tool holder operatively connected to said arbour so as to rotate therewith, and slidable in guides thereon radially with respect to the axis of rotation of said arbour, a rack on said tool holder disposed transversely to the axis of said arbour arranged in mesh with a gear wheel rotatably mounted in said arbour, a second rack disposed axially of said arbour and arranged in mesh with said gear wheel, an operative connection between said second rack and a cage arranged exteriorly of said arbour and movable axially thereof, means for rotating said cage with said arbour, a ring member arranged to surround said arbour and carried by a supporting member, at least two pairs of segmental cams diametrically disposed with respect to said arbour and pivotally mounted at their ends to said ring supporting member, said cams being spaced relatively to one another about the axis of said arbour, means for rocking said cams about their pivots in the axial direction of said arbour, said ring and said cams being operable to engage with said cage and effect movement thereof in one direction axially of said arbour and a yielding control arranged to effect movement of said cage in the other direction for the purpose specified, a screw-threaded bore in said ring supporting member arranged in engagement with a corresponding screw-threaded sleeve maintained against axial displacement and gear mechanism for rotating said sleeve.

15. In an apparatus for machining the circumferential portions of rolls of the type described the combination of means for supporting at least one roll to be machined, an arbour rotatable about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder and operable to effect said radial movements thereof as the same rotates, an operative connection between said mechanism and a cage rotatable with and movable axially relatively to said arbour, a ring member arranged to surround said arbour and at least two pairs of segmental cams diametrically disposed with respect to said arbour said cams being angularly spaced relatively to one another about the axis of said arbour, said ring and said cams being operable to engage with said cage and effect movement thereof in at least one direction axially of said arbour as the same rotates and thereby effect said radial movements of said tool holder.

16. In an apparatus for machining the circumferential portions of rolls of the type described the combination of means for supporting at least one roll to be machined, an arbour rotatable about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder operable to effect said radial movements thereof as the same rotates, an operative connection between said mechanism and a cage rotatable with and movable axially with respect to said arbour, a ring member arranged to surround said arbour and at least two pairs of segmental cams diametrically disposed with respect to said arbour, said cams being angularly spaced relatively to one another about the axis of said arbour, said ring and said cams being operable to engage with said cage and effect movement thereof in one direction axially of said arbour as the same rotates and a yielding control operable to effect movement of said cage in the other direction, said cams and said yielding control being thereby operable to effect radial movements of said tool holder, and means operatively connected to said ring and said cams for moving the same relatively to the said arbour in an axial direction thereof.

17. In an apparatus for machining the circumferential portions of rolls of the type described the combination of means for supporting at least one roll to be machined, an arbour rotatably mounted about an axis disposed transversely to the axis of a roll so supported, means for rotating said arbour, a tool holder operatively connected to said arbour so as to rotate therewith and movable radially thereon with respect to the axis of rotation of said arbour, mechanism operatively connected to said tool holder for controlling said radial movements thereof as the same rotates, an operative connection between said mechanism and a cage rotatable with and movable axially with respect to said arbour, a ring member arranged to surround said arbor, a non-rotatable supporting member for said ring, at least two pairs of segmental cams diametrically disposed with respect to the said arbour and pivotally mounted at their ends to said ring supporting member said cams being angularly spaced relatively to one another about the axis of said arbour, means for rocking said cams about their pivots, said ring and said cams being operable to engage with said cage and effect movement thereof in one direction axially of said arbour and a yielding control arranged to effect movement of said cage in the other direction and thereby effect corresponding radial movements of said tool holder and means operatively connected to said ring supporting member for moving the same axially of said arbour.

18. In an apparatus for machining the circumferential portions of rolls of the type described the combination of means for supporting at least one roll to be machined, an arbour rotatably mounted about an axis disposed transversely to the axis of a roll supported by said means, means for rotating said arbour, a tool holder operatively connected to said arbour so as to rotate therewith and movable radially thereon with respect to the axis of rotation of said arbour, means operatively connected to said tool holder and operable to effect said radial movements thereof during at least three different angles of movement in each rotation of said tool holder, means for rotating said roll between rotations of said tool holder and means operatively connected to said roll supporting means for effecting movement of a roll supported thereby towards and away from said tool holder in a direction transverse to the axis of said roll.

19. In an apparatus for machining the circumferential portions of rolls of the type described the combination of means for supporting a pair of rolls to be machined with their axes disposed parallel to one another, a tool holder located between a pair of rolls so supported, means for rotating said tool holder about an axis disposed transversely to the plane extending through the axes of said rolls, means operatively connected to said tool holder and operable to effect radial movements thereof with respect to the axis of rotation thereof during at least four angles of movement in each rotation of said tool holder as the same rotates, means for rotating said rolls between rotations of said tool holder and means operatively connected to said roll supporting means and operable to effect movement of each roll towards and away from said tool holder in a direction transverse to the axes of said rolls.

20. In an apparatus for machining the circumferential portions of rolls of the type described the combination of two pairs of head-stocks each arranged to support a roll to be machined with the axes of the said rolls disposed parallel to one another, feed mechanism operatively connected to said head-stocks and adapted to move each pair of head-stocks towards and away from the other pair in a direction transverse to the axis of a roll supported thereby, a hollow arbour rotatable about an axis disposed transversely to the plane extending through the axes of the rolls supported by said head-stocks means for rotating said arbour, a tool holder located between said rolls and operatively connected to said arbour so as to rotate therewith and slidable in guides radially with respect to the axis of rotation of the said arbour, a rack on said tool holder disposed transversely to the axis of said arbour arranged in mesh with a gear wheel rotatably mounted in said arbour, a second rack disposed axially of said arbour and arranged in mesh with said gear wheel, a pin carried by said second rack and extending through diametrically opposed slots formed axially thereon, means for rotating said cage with said arbour, an operative connection between said pin and said cage, a ring member arranged to surround said arbour and carried by a non-rotatable supporting member, at least two pairs of segmental cams diametrically disposed with respect to said arbour and pivotally mounted at their ends to said ring supporting member, said cams being angularly spaced relatively to one another about the axis of said arbour, means for rocking said cams about their pivots in the axial direction of said arbour, said ring and said cams being operable to engage with said cage and effect movements thereof in one direction axially of said arbour and a yielding control arranged to effect movement of said cage in the other direction for effecting corresponding radial movements of said tool holder, a screw-threaded bore in said ring supporting member arranged in engagement with a corresponding screw-threaded sleeve maintained against axial displacement, gear mechanism for rotating said sleeve and means for rotating said roll between rotations of said tool holder.

21. In an apparatus for machining the circumferential portions of rolls of the type described the combination of two pairs of head-stocks each arranged to support a roll to be machined with the axes of the said rolls disposed parallel to one another, feed mechanism operatively connected to said head-stocks and adapted to move each pair of head-stocks towards and away from the other pair in a direction transverse to the axis of a roll supported thereby, a tool holder disposed between a pair of rolls supported by said head-stocks, means for rotating said tool holder about an axis disposed transversely to the plane extending through the axes of said rolls, means for moving said tool holder radially with respect to the axis of rotation thereof during at least four different angles of movement in each rotation of said tool holder and means for rotating said rolls between rotations of said tool holder.

In testimony whereof, I have signed my name to this specification.

HANS SCHIMMEL.